US012075841B2

United States Patent
Lin et al.

(10) Patent No.: US 12,075,841 B2
(45) Date of Patent: Sep. 3, 2024

(54) ELECTRONIC CIGARETTE ENCRYPTED BY WIRELESS ELECTRONIC TAG AND ENCRYPTION METHOD

(71) Applicant: HUIZHOU HAPPY VAPING TECHNOLOGY LIMITED, Guangdong (CN)

(72) Inventors: Guangrong Lin, Guangdong (CN); Xianbin Zheng, Guangdong (CN); Xiyong Zhang, Guangdong (CN)

(73) Assignee: HUIZHOU HAPPY VAPING TECHNOLOGY LIMITED, Huizhou (CN)

( * ) Notice: Subject to any disclaimer, the term of this patent is extended or adjusted under 35 U.S.C. 154(b) by 567 days.

(21) Appl. No.: 17/413,058

(22) PCT Filed: Dec. 5, 2019

(86) PCT No.: PCT/CN2019/123173
§ 371 (c)(1),
(2) Date: Jun. 11, 2021

(87) PCT Pub. No.: WO2020/140677
PCT Pub. Date: Jul. 9, 2020

(65) Prior Publication Data
US 2022/0039481 A1    Feb. 10, 2022

(30) Foreign Application Priority Data
Jan. 4, 2019    (CN) .......................... 201910009545.1

(51) Int. Cl.
*A24F 40/65*    (2020.01)
*A24F 40/50*    (2020.01)
(Continued)

(52) U.S. Cl.
CPC .............. *A24F 40/65* (2020.01); *A24F 40/50* (2020.01); *A24F 40/51* (2020.01); *A24F 40/53* (2020.01);
(Continued)

(58) Field of Classification Search
CPC .......... A24F 40/65; A24F 40/50; A24F 40/51; A24F 40/53; A24F 40/60; A24F 40/10;
(Continued)

(56) References Cited

U.S. PATENT DOCUMENTS

| 10,448,670 B2 * | 10/2019 | Talon ...................... G01F 15/06 |
| 2023/0180826 A1 * | 6/2023 | Murison ................ B67D 7/145 |
| | | 206/255 |

FOREIGN PATENT DOCUMENTS

| CN | 203446536 U | 2/2014 |
| CN | 209563493 U | 11/2019 |
| WO | WO-2015035689 A1 * | 3/2015 ........... A24F 47/008 |

OTHER PUBLICATIONS

International Search Report of PCT Patent Application No. PCT/CN2019/123173 issued on Mar. 6, 2020.

* cited by examiner

*Primary Examiner* — Justin M Kratt

(57) ABSTRACT

An electronic cigarette encrypted by wireless electronic tag and an encrypting method thereof are provided. The electronic cigarette comprises a vaporizer (1) and a battery assembly (2) connected with each other, the vaporizer (1) comprises a heating resistor (3) and a wireless electronic tag preset with encryption information, the battery assembly (2) comprises a battery (4) and a control circuit board (5) arranged with a microcontroller, a resistance detection unit, a voltage output control unit, a wireless electronic tag reader, and a wireless signal transmitter, wherein the wireless electronic tag reader reads the encryption information and
(Continued)

sends it to the microcontroller, and the voltage output control unit outputs voltage to the heating resistor on the premise that the resistance value of the heating resistor is detected by the resistance detection unit and the encryption information is read by the wireless electronic tag reader as well.

13 Claims, 3 Drawing Sheets

(51) Int. Cl.
*A24F 40/51* (2020.01)
*A24F 40/53* (2020.01)
*A24F 40/60* (2020.01)
*G06F 21/44* (2013.01)
*G06F 21/73* (2013.01)
*G06Q 30/018* (2023.01)
*H04L 9/40* (2022.01)
*A24F 40/10* (2020.01)
*A24F 40/42* (2020.01)
*A24F 40/46* (2020.01)
*A24F 40/49* (2020.01)
*G06K 7/10* (2006.01)
*G06K 17/00* (2006.01)
*H04W 4/80* (2018.01)
*H04W 12/03* (2021.01)

(52) U.S. Cl.
CPC .............. *A24F 40/60* (2020.01); *G06F 21/44* (2013.01); *G06F 21/73* (2013.01); *G06Q 30/0185* (2013.01); *H04L 63/0428* (2013.01); *H04L 63/10* (2013.01); *A24F 40/10* (2020.01); *A24F 40/42* (2020.01); *A24F 40/46* (2020.01); *A24F 40/49* (2020.01); *G06K 7/10009* (2013.01); *G06K 17/00* (2013.01); *H04W 4/80* (2018.02); *H04W 12/03* (2021.01)

(58) Field of Classification Search
CPC .......... A24F 40/42; A24F 40/46; A24F 40/49; A24F 47/008; G06F 21/44; G06F 21/73; G06Q 30/0185; H04L 63/0428; H04L 63/10; G06K 7/10009; G06K 17/00; H04W 4/80; H04W 12/03
See application file for complete search history.

ELECTRONIC CIGARETTE ENCRYPTED BY WIRELESS ELECTRONIC TAG AND ENCRYPTION METHOD

TECHNICAL FIELD

The disclosure relates to the field of electronic cigarettes, more particularly to an electronic cigarette encrypted by wireless electronic tag and an encrypting method of an electronic cigarette encrypted by a wireless electronic tag.

BACKGROUND

The electronic cigarettes usually heat the e-cigarette liquid by means of a vaporizer, to produce vapor for the smoker. Since the vapor produced by the electronic cigarettes does not contain tobacco tar, the harm to the human body is reduced. Thus, the electronic cigarettes are widely used and gradually replace tobacco cigarettes.

Existing electronic cigarettes usually comprise a vaporizer and a battery assembly connected with each other. Herein, the vaporizers, which need to be replaced each time when the e-cigarette liquid runs out, are consumables, while the battery assembly can be repeatedly charged when the battery runs out. The counterfeits or imitations of famous electronic cigarettes in great demand are available on the market. Thus, when the old ones run out, the consumers may get the counterfeits or imitations of the vaporizers which are prone to failures during using as neither the product quality nor the liquid quality is guaranteed. The interests of consumers may be damaged, and legitimate manufactures and sellers may be adversely affected.

SUMMARY

Technical Problem

An object of the disclosure is to overcome the above deficiencies and provide an electronic cigarette encrypted by a wireless electronic tag and an encrypting method thereof. The electronic cigarette encrypted by a wireless electronic tag is provided with a battery assembly for identifying the wireless electronic tag arranged within the vaporizer and preset with encryption information.

Technical Solutions

The disclosure provides a technical solution as follow. The electronic cigarette encrypted by a wireless electronic tag comprises a vaporizer and a battery assembly connected with each other. Herein, the vaporizer comprises a heating resistor for heating and vaporizing the electronic cigarette liquid, and the battery assembly comprises a battery and a control circuit board. It is characterized in that the vaporizer further comprises a wireless electronic tag preset with encryption information. The control circuit board is arranged with a microcontroller, a resistance detection unit, a voltage output control unit, a wireless electronic tag reader, and a wireless signal transmitter. Herein, the resistance detection unit is electrically connected with the heating resistor and the microcontroller, respectively. The resistance detection unit is configured to detect the resistance value of the heating resistor and feedback the resistance value signal to the microcontroller. The microcontroller is electrically connected with the voltage output control unit, and the voltage output control unit is configured to operate under control of the microcontroller. The wireless electronic tag reader is bi-directional electrically connected with the microcontroller, and the wireless electronic tag reader is configured to read, with a wireless signal being transmitted by the wireless signal transmitter, the encryption information of the wireless electronic tag and send it to the microcontroller. The voltage output control unit is configured to output voltage to the heating resistor on the premise that the resistance value of the heating resistor can be detected by the resistance detection unit and the encryption information can be read by the wireless electronic tag reader as well.

Preferably, an unlock switch may be arranged inside the battery assembly, a trigger switch may be arranged inside the vaporizer or inside the battery assembly, and the unlock switch and the trigger switch may be respectively electrically connected with the microcontroller, to allow feedback of signals.

Preferably, the unlock switch may be a manual pushbutton switch, and the trigger switch may be a microphone-type automatic air flow switch.

Preferably, the voltage output control unit may be configured to output voltage to the heating resistor further on the premise that both the unlock switch and the trigger switch are turned on as well.

Preferably, the control circuit board may be further arranged with a battery charging unit, a battery protection unit, a battery supply unit, and a battery detection unit, wherein the battery charging unit may be configured to charge the battery, the battery may be configured to supply power to the voltage output control unit by the battery protection unit and the battery supply unit in sequence, the microcontroller may be electrically connected with the battery charging unit, the battery protection unit, and the battery detection unit, respectively, the battery detection unit may be configured to detect the electrical signal of the battery and feedback to the microcontroller, and the microcontroller may be configured to provide over-current protection, overload protection, and short circuit protection for the battery by means of the battery protection unit.

Preferably, a display unit may be arranged on an outer surface of the vaporizer or of the battery assembly and may be electrically connected with the microcontroller.

Preferably, the display unit may comprise an LED light.

Preferably, the microcontroller may be a microcontroller chip.

The disclosure provides another technical solution as follow. An encrypting method of an electronic cigarette encrypted by a wireless electronic tag comprises steps as follows.

(1) Setting encryption information parameter of the wireless electronic tag, scanning time of the wireless signal transmitter, and a stand-by time;

(2) By means of the microcontroller, determining whether the electronic cigarette is in an on state, if no, wait until go to the next step; if yes, go to the step (4);

(3) Activating the unlock switch to perform a turn-on operation;

(4) Determining whether a resistance value of the heating resistor can be detected by means of the resistance detection unit, if yes, go to the next step; if no, go to the step (11);

(5) By means of the wireless electronic tag reader, reading the encryption information of the wireless electronic tag with the assistance of the wireless signal transmitter;

(6) By means of the microcontroller, determining whether the encryption information coincides with the preset one, if yes, go to the next step; if no, emit flash light by means of the LED light to indicate the vaporizer is unauthorized, and then go to the step (11);

(7) By means of the microcontroller, determining whether the trigger switch is turned on or not, if yes, go to the next step; if no, go to the step (9);

(8) Outputting, by means of the voltage output control unit, voltage to the heating resistor for vaporizing the electronic cigarette liquid and producing electronic cigarette vapor, and meanwhile go back to the previous step;

(9) Entering a stand-by state of the electronic cigarette;

(10) By means of the microcontroller, determining whether the stand-by time exceeds the preset value or not, if yes, go to the next step; if no, go back to the step (7);

(11) Entering an off state.

Advantages

The electronic tag reader is arranged inside the battery assembly. The electronic tag reader is configured to read, with a wireless signal being transmitted by the wireless signal transmitter, the wireless electronic tag arranged within the vaporizer and having encryption information. The encryption information can be identified by means of the microcontroller, such that the voltage output unit can be controlled to output or not output voltage to the heating resistor. In this way, the electronic cigarette can be operated normally only when a permitted vaporizer is connected with a permitted battery assembly, thereby effectively avoid the use of unpermitted vaporizers and protect the interests of consumers and manufactures and sellers as well.

DETAILED DESCRIPTION OF ILLUSTRATED EMBODIMENTS

In order to make purposes, technical solutions and advantages of the disclosure clearer, the disclosure will be further explained in detail with reference to drawings and embodiments described hereinafter. It should be understood that the specific embodiments described herein are merely used to explain the disclosure and are not intended to limit the present invention.

Figure 1:
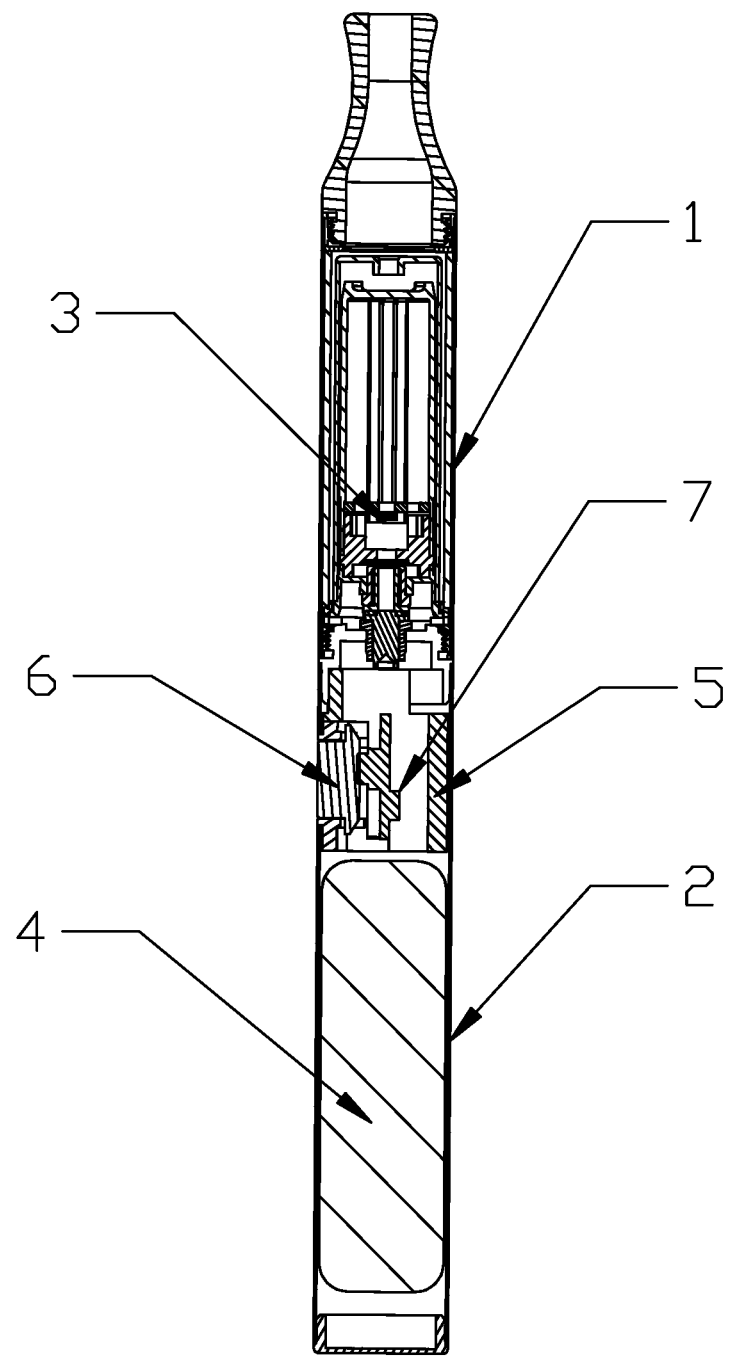
FIG. 1 is a cross-sectional view of an electronic cigarette encrypted by a wireless electronic tag according to the disclosure.

The disclosure provides an electronic cigarette encrypted by wireless electronic tag, as shown in FIG. 1, comprising a vaporizer 1 and a battery assembly 2 connected with each other. Herein, the vaporizer 1 comprises a wireless electronic tag (not shown in the drawings) preset with encryption information and comprises a heating resistor 3 for heating and vaporizing the electronic cigarette liquid. A battery 4, a control circuit board 5, and an unlock switch 6 are disposed inside the battery assembly 2. A trigger switch 7 is arranged inside the vaporizer 1 (or inside the battery assembly 2).

Figure 2:
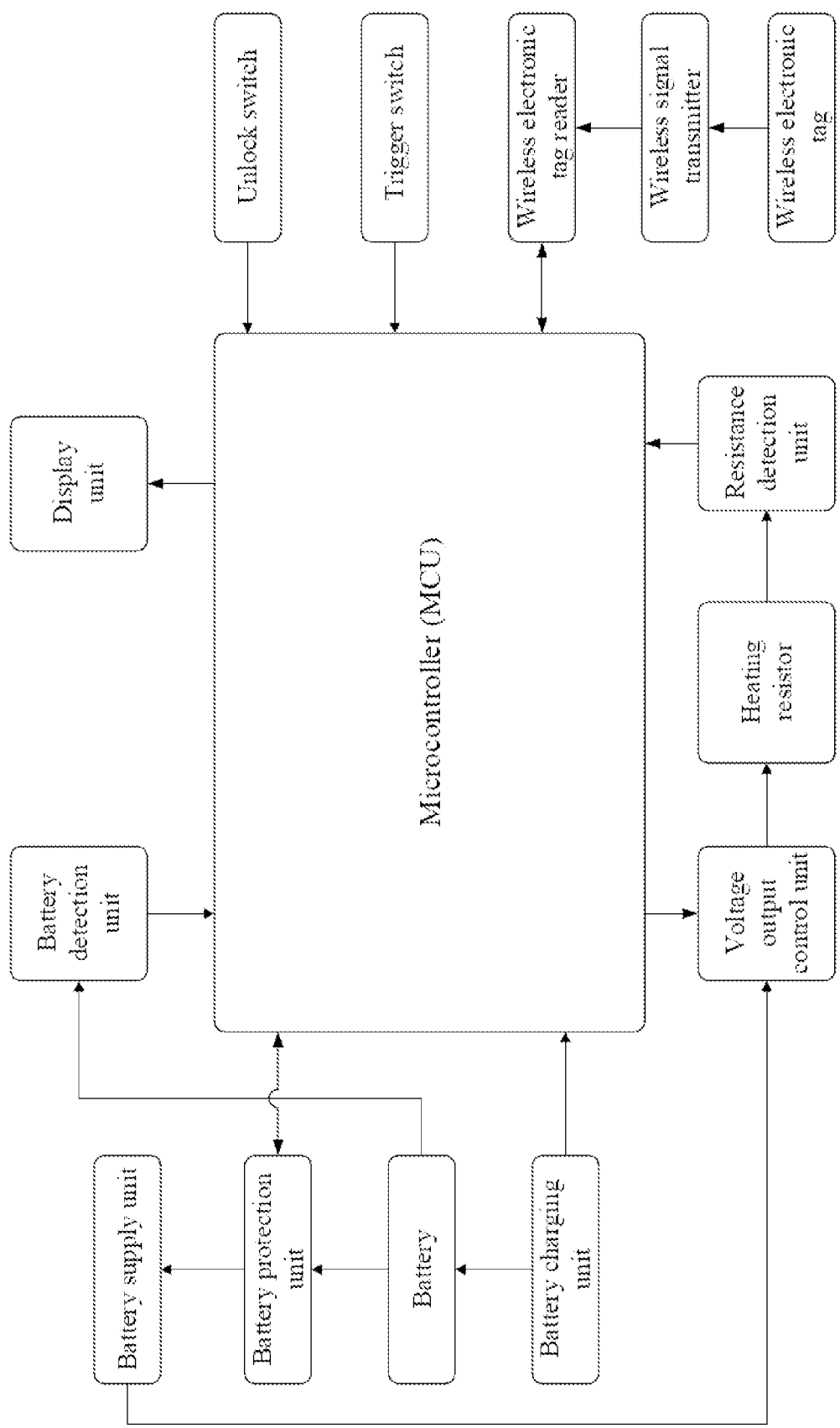
FIG. 2 is a functional diagram of a control circuit board of an electronic cigarette encrypted by a wireless electronic tag according to the disclosure.

Referring to FIG. 2, the control circuit board 5 is arranged with a plurality of components and circuits, including a microcontroller, a resistance detection unit, a voltage output control unit, a wireless electronic tag reader, and a wireless signal transmitter. Herein, the resistance detection unit is electrically connected with the heating resistor and the microcontroller, respectively. The resistance detection unit is configured to detect the resistance value of the heating resistor and feedback the resistance value signal to the microcontroller. When the resistance value signal can be detected, it means the vaporizer 1 arranged with the heating resistor 3 is connected with the battery assembly 2. If no resistance value signal can be detected, it means the battery assembly 2 is not connected with the vaporizer 1.

Referring to FIG. 2, the microcontroller is electrically connected with the voltage output control unit and the voltage output control unit is operated under the control of the microcontroller. The wireless electronic tag reader is bi-directional electrically connected with the microcontroller, and the wireless electronic tag reader is configured to read, when a wireless signal is sent by the wireless signal transmitter, the encryption information of the wireless electronic tag and send it to the microcontroller. The voltage output control unit is configured to output, under the control of the microcontroller, voltage to the heating resistor. The voltage can be output only when the resistance value of the heating resistor is detected by means of the resistance detection unit, and the encryption information is read by means of the wireless electronic tag reader as well. That is, the battery assembly 2 is configured to supply power to the vaporizer 1 to allow the user to vape only when the vaporizer connected to the battery assembly is detected and identified as a qualified one having encryption information.

Referring to FIG. 1, the unlock switch 6 is arranged inside the battery assembly, and the trigger switch 7 is arranged inside the vaporizer 1 or the battery assembly 2. The unlock switch 6 and the trigger switch 7 are respectively electrically connected with the microcontroller to feedback signals. The unlock switch 6 is electrically connected with the microcontroller, to feedback a signal indicating whether the unlock switch 6 is activated or not. The trigger switch 7 is electrically connected with the microcontroller, to feedback whether the trigger switch 7 is activated or not. In an embodiment of the disclosure, the unlock switch 6 may be a manual pushbutton switch, and the trigger switch 7 may be a microphone-type automatic air flow switch.

Referring to FIG. 2, the voltage output control unit is configured to output voltage to the heating resistor only when both the unlock switch and the trigger switch are activated as well.

Referring to FIG. 2, the control circuit board is further arranged with a plurality of components and circuits, including a battery charging unit, a battery protection unit, a battery supply unit, and a battery detection unit. Herein, the battery charging unit is configured to charge the battery. The battery is configured to supply power to the voltage output control unit by the battery protection unit and the battery supply unit in sequence. The microcontroller is electrically connected with the battery charging unit, the battery protection unit, and the battery detection unit, respectively. The battery detection unit is configured to detect the electrical signal of the battery and feedback it to the microcontroller. The microcontroller provides over-current protection, overload protection, and short circuit protection for the battery by means of the battery protection unit.

Referring to FIGS. 1 and 2, a display unit (not shown in the drawings) is arranged on an outer surface of the vaporizer 1 or of the battery assembly 2 and is electrically connected with the microcontroller.

The display unit is arranged with an LED Light. The microcontroller (MCU) may be a single microcontroller chip or a combination of a plurality of microcontroller chips.

Figure 3:
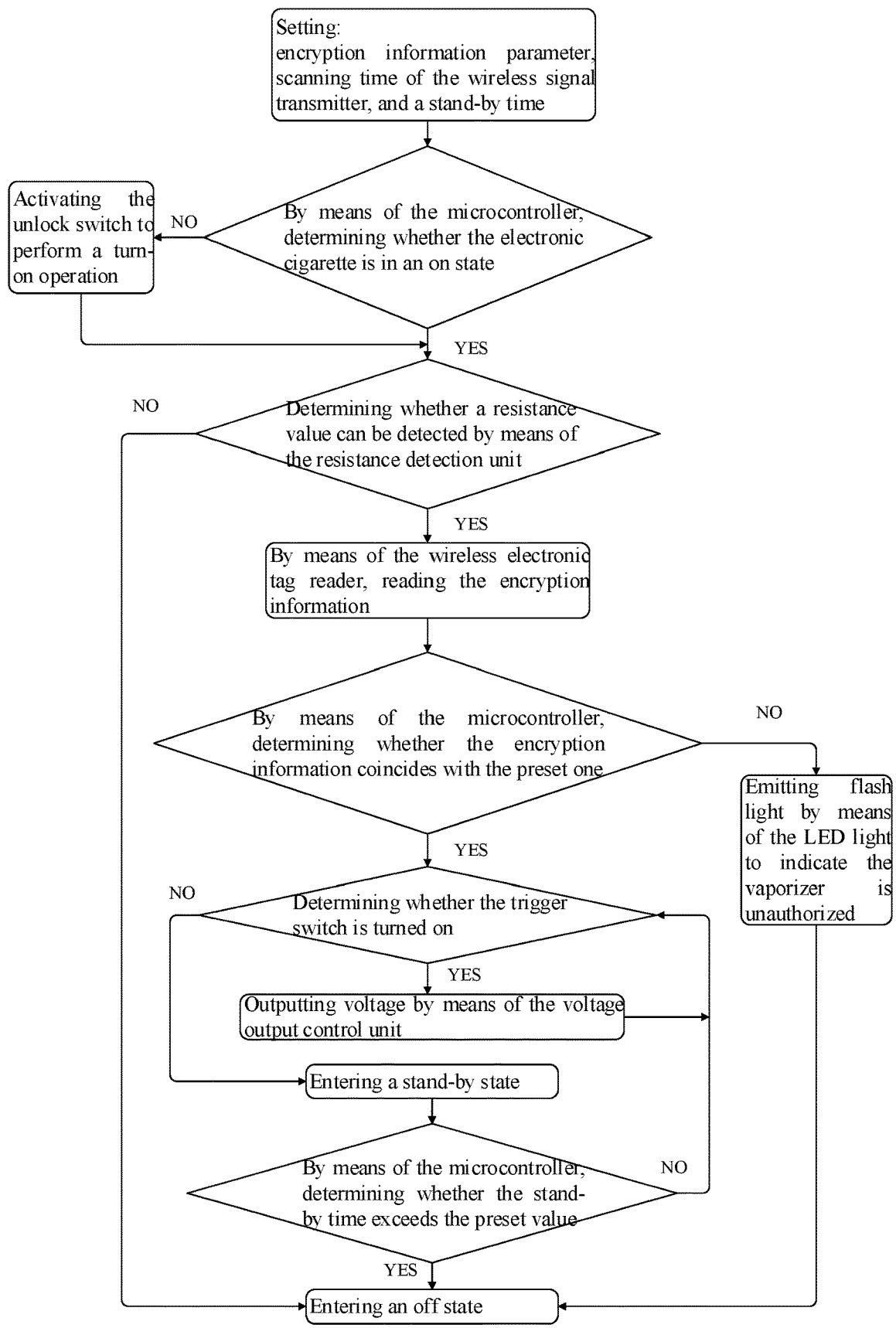
FIG. 3 is a flowchart illustrating a encrypting method of an electronic cigarette encrypted by a wireless electronic tag according to the disclosure.

Referring to FIG. 3, an encrypting method of an electronic cigarette encrypted by a wireless electronic tag comprises steps as follows.

(1) Setting encryption information parameter of the wireless electronic tag, scanning time of the wireless signal transmitter, and a stand-by time of the electronic cigarette;
(2) Determining, by means of the microcontroller, whether the electronic cigarette is in an on state, if no, wait or go to the next step; if yes, go to the step (4);
(3) Performing an unlock operation to turn on the electronic cigarette when the unlock switch is pressed;
(4) Determining whether a resistance value of the heating resistor is detected by means of the resistance detection unit, if yes, it means the vaporizer has been connected with the battery assembly, then go to the next step; if no, it means the vaporizer has not been connected yet, then go to the step (11);
(5) By means of the wireless electronic tag reader, reading the encryption information of the wireless electronic tag with the assistance of the wireless signal transmitter and sending it to the microcontroller;
(6) Determining, by means of the microcontroller, whether the encryption information coincides with the preset one, if yes, it means the vaporizer is qualified, then go to the next step; if no, it means the vaporizer is not qualified, then emit flash light by means of the LED light and go to the step (11);
(7) Determining, by means of the microcontroller, whether the trigger switch is turned on or not, if yes, it means the user is performing a smoking operation, then go to the next step; if no, it means there is no smoking operation, then go to the step (9);
(8) Outputting, by means of the voltage output control unit, voltage to the heating resistor for vaporizing the electronic cigarette liquid and producing electronic cigarette vapor, and meanwhile go back to the previous step;
(9) Entering a stand-by state of the electronic cigarette;
(10) Determining, by means of the microcontroller, whether the stand-by time exceeds the preset value or not, if yes, go to the next step; if no, go back to the step (7);
(11) Controlling, by means of the microcontroller, the electronic cigarette to turn off automatically, in such a manner that most of connecting circuits of all units and the microcontroller are powered off, to enter an off state.

INDUSTRIAL APPLICABILITY

All the above are merely preferred embodiments of the present invention. The present invention is intended to cover all equivalent arrangements and modifications without departing from the scope of the present invention.

The invention claimed is:

1. An electronic cigarette encrypted by a wireless electronic tag, comprising a vaporizer and a battery assembly connected with each other, wherein the vaporizer comprises a heating resistor for heating and vaporizing electronic cigarette liquid of the electronic cigarette, and the battery assembly comprises a battery and a control circuit board, wherein the vaporizer further comprises the wireless electronic tag preset with encryption information, the control circuit board is arranged with a plurality of components and circuits including a microcontroller, a resistance detection unit, a voltage output control unit, a wireless electronic tag reader, and a wireless signal transmitter, wherein the resistance detection unit is electrically connected with the heating resistor and the microcontroller respectively, the resistance detection unit is configured to detect a resistance value of the heating resistor and feedback a resistance value signal to the microcontroller, the microcontroller is electrically connected with the voltage output control unit, and the voltage output control unit is configured to operate under control of the microcontroller, the wireless electronic tag reader is bi-directional electrically connected with the microcontroller, and the wireless electronic tag reader is configured to read, with a wireless signal being transmitted by the wireless signal transmitter, the encryption information of the wireless electronic tag and send the encryption information to the microcontroller, the voltage output control unit is configured to output voltage to the heating resistor on a premise that the resistance value of the heating resistor is detected by the resistance detection unit and the encryption information is read by the wireless electronic tag reader as well;

wherein the control circuit board is further arranged with a plurality of components and circuits including a battery charging unit, a battery protection unit, a battery supply unit, and a battery detection unit, wherein the battery charging unit is configured to charge the battery, the battery is configured to supply power to the voltage output control unit by the battery protection unit and the battery supply unit in sequence, the microcontroller is electrically connected with the battery charging unit, the battery protection unit, and the battery detection unit respectively, the battery detection unit is configured to detect an electrical signal of the battery and feedback to the microcontroller, and the microcontroller is capable of providing over-current protection, overload protection, and short circuit protection for the battery by means of the battery protection unit.

2. The electronic cigarette encrypted by the wireless electronic tag according to claim 1, wherein an unlock switch is arranged inside the battery assembly, a trigger switch is arranged inside the vaporizer or inside the battery assembly, and the unlock switch and the trigger switch are respectively electrically connected with the microcontroller, to allow feedback of signals.

3. The electronic cigarette encrypted by the wireless electronic tag according to claim 2, wherein the unlock switch is a manual pushbutton switch, and the trigger switch is a microphone-type automatic air flow switch.

4. The electronic cigarette encrypted by the wireless electronic tag according to claim 2, wherein the voltage output control unit is configured to output voltage to the heating resistor further on a premise that both the unlock switch and the trigger switch are turned on as well.

5. The electronic cigarette encrypted by the wireless electronic tag according to claim 1, wherein a display unit is arranged on an outer surface of the vaporizer or of the battery assembly and is electrically connected with the microcontroller.

6. The electronic cigarette encrypted by the wireless electronic tag according to claim 5, wherein the display unit comprises an LED light.

7. The electronic cigarette encrypted by the wireless electronic tag according to claim 1, wherein the microcontroller is a microcontroller chip.

8. A method of operating the electronic cigarette encrypted by the wireless electronic tag according to claim 1, comprising steps of:

(1) setting an encryption information parameter of the wireless electronic tag, scanning time of a wireless signal transmitter, and a stand-by time;

(2) determining whether the electronic cigarette is in an on state by means of the microcontroller, if no, go to next step; if yes, go to step (4);

(3) activating an unlock switch to perform a turn-on operation;

(4) determining whether a resistance value of the heating resistor is detected by means of a resistance detection unit, if yes, go to next step; if no, go to step (11);

(5) with assistance of the wireless signal transmitter, reading the encryption information of the wireless electronic tag by means of a wireless electronic tag reader;

(6) determining whether the encryption information coincides with preset one by means of the microcontroller, if yes, go to next step; if no, emit flash light by means of an LED light to indicate the vaporizer is unauthorized, and then go to step (11);

(7) determining whether a trigger switch is turned on by means of the microcontroller, if yes, go to next step; if no, go to step (9);

(8) outputting, by means of a voltage output control unit, voltage to the heating resistor for vaporizing electronic cigarette liquid and producing electronic cigarette vapor, and meanwhile go back to previous step;

(9) entering a stand-by state of the electronic cigarette;

(10) determining whether a stand-by time exceeds the preset value by means of the microcontroller, if yes, go to next step; if no, go back to the step (7);

(11) entering an off state.

9. The electronic cigarette encrypted by the wireless electronic tag according to claim 2, wherein the microcontroller is a microcontroller chip.

10. The electronic cigarette encrypted by the wireless electronic tag according to claim 3, wherein the microcontroller is a microcontroller chip.

11. The electronic cigarette encrypted by the wireless electronic tag according to claim 4, wherein the microcontroller is a microcontroller chip.

12. The electronic cigarette encrypted by the wireless electronic tag according to claim 5, wherein the microcontroller is a microcontroller chip.

13. The electronic cigarette encrypted by the wireless electronic tag according to claim 6, wherein the microcontroller is a microcontroller chip.

* * * * *